June 10, 1930.  D. A. DONAHUE  1,763,603
WINDSHIELD WEATHER STRIP
Filed Jan. 9, 1929
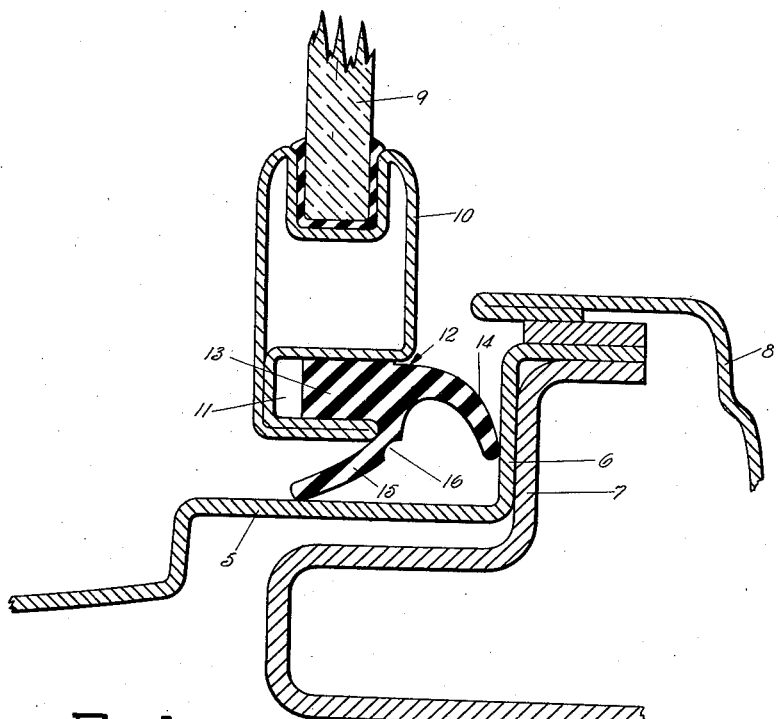
Fig-I
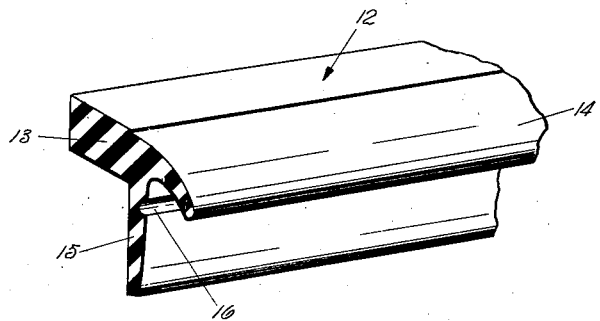
Fig-II
INVENTOR.
Dennis A. Donahue
BY P. M. Pomeroy
ATTORNEY Patented June 10, 1930

1,763,603

UNITED STATES PATENT OFFICE

DENNIS A. DONAHUE, OF SOUTH BEND, INDIANA, ASSIGNOR TO THE STUDEBAKER CORPORATION, OF SOUTH BEND, INDIANA, A CORPORATION OF NEW JERSEY

WINDSHIELD WEATHER STRIP

Application filed January 9, 1929. Serial No. 331,221.

This invention relates to weather strips for vehicle bodies and particularly to weather strips for closing the space between the cowl and/or body frame for the windshield and windshield.

The principal object of the invention is to provide a weather strip having a body portion and a member projecting therefrom substantially perpendicular thereto, a recess being formed in the projecting member to permit the free flexure thereof when the same is moved into contact with the cowl.

A further object is to provide a longitudinally extending recess in the side face of the projecting member on the side opposite the windshield frame to permit free flexure of the member when moved into contact with the cowl and/or body frame for the windshield.

The above being among the objects of the present invention, the same consists of certain features and combinations of parts to be hereinafter described and then claimed, having the above and other objects in view.

Referring to the drawing in which like numerals refer to like parts throughout the several views, Figure I is a sectional view showing the weather strip mounted in the windshield frame and contacting with the vehicle body cowl.

Figure II is a fragmentary perspective view of the weather strip.

In weather strips heretofore used to close the space between the windshield and the cowl, the projecting part of the weather strip which contacts with the cowl when the windshield is in closed position has been so formed that great difficulty has been experienced in opening and closing the windshield due to the fact that the projecting part of the weather strip would bind against the cowl thus preventing the free movement of the windshield. The weather strip forming the subject matter of this invention eliminates the troubles and disadvantages heretofore mentioned due to the fact that the projecting part of the weather strip which contacts with the cowl is so formed that the same is permitted to flex freely as the windshield is moved into closed position.

The free movement of my weather strip is made possible by providing a recess in the side of the projecting member adjacent the body portion of the weather strip, the recess preferably being formed on the side face of the projecting member which is opposite the windshield frame.

As an illustration of one embodiment of my invention, I have shown a portion of a windshield cowl 5 which terminates adjacent its end in an upwardly extending portion 6 to which is secured a body reinforcing member 7 extending transversely of the vehicle body. An instrument panel 8, a portion of which is shown in Figure I, is secured to the cowl member in any desired manner. As the body construction, except so far as it relates to the weather strip coacting therewith, forms no part of my invention, a further description of the same is believed to be unnecessary.

A windshield 9 is mounted in a frame 10 which has a recess 11 formed therein adapted to receive a substantially T-shaped weather strip 12 to be hereinafter described more in detail.

The weather strip 12 is preferably made of a rubber composition, or other similar material, and comprises a body portion 13 having a curved projecting portion 14 of a lesser cross-sectional area extending therefrom adapted, when the windshield is in closed position, to contact with the portion 6 and the cowl 5 to exclude air or rain from entering between the windshield and the cowl. The weather strip 12 includes a second member 15 having its longitudinal axis extending substantially perpendicular to the body portion 13 and the curved extension 14. The projection 15 extends downwardly from the body portion 12 to contact with the cowl 5 and when the windshield is in closed position the member 15 is caused to be moved out of its perpendicular position to the position shown in Figure I. A recess 16 is formed in the member 15 adjacent the body portion 12, the recess extending longitudinally of the member 15 parallel with the main body portion 13. The recess 16 is preferably formed in the side face of the member 15 on the side opposite the side face which contacts with the windshield frame 10.

As clearly shown in Figure I, the cross-sectional area of the member 15 is considerably less at the recess 16 than the cross-sectional area of the corresponding depending portion. Because of the fact that the material is thinner at the recess 16 the depending member 15 is in effect hinged at this point which permits the free flexure of the same when the member 15 is caused to contact with the cowl 5.

It will thus be seen that when the windshield is moved to the closed position that the depending member 15 of the weather strip will move freely from its perpendicular position to the position shown in Figure I without any binding of the parts or injury to the weather strip. As the member 15 of the weather strip is normally maintained in a distorted position when the windshield is in closed position, the same is caused to lie firmly against the cowl 5 and thus prevent air or rain from entering between the windshield and the cowl.

In constructions heretofore used it has been impossible to use a member to close the space between the cowl and windshield section which had sufficient cross-sectional area to withstand the wear and abuses to which such a member is put. By providing the member 15 with a reduced portion adjacent the body 13, the depending portion can be of considerable cross-sectional area thus increasing its effectiveness and wearing quality without decreasing its flexibility.

While I have shown a preferred embodiment of my invention, it is to be understood that detailed changes can be made without departing from the spirit and substance of my invention, and that the various modifications apparent to those skilled in the art are intended to be included herein as indicated in the following claims.

What I claim is:

1. In combination with a vehicle body having a cowl formed with two faces lying in different planes and a windshield including a frame therefor, a weather strip adapted to close the space between said cowl and windshield, said strip including a body portion secured in said windshield frame, a curved member extending longitudinally of one side of said body portion adapted to bear against one face of said cowl, a second member extending longitudinally of said body portion adapted to bear against the other face of said cowl, the longitudinal axis of said second member being substantially perpendicular to the longitudinal axis of said curved member, and a recess formed in said second member extending longitudinally thereof to permit flexure of said member relative to said body portion.

2. In combination with a vehicle body having a cowl formed with two faces substantially perpendicular to each other and a windshield including a frame therefor, a substantially T-shaped weather strip supported by said frame adapted to contact with the two faces of said cowl to close the space between said cowl and windshield, the depending leg of said strip having a recess therein extending longitudinally thereof to permit flexure of said leg when engaged with one face of said cowl.

3. In combination with a vehicle body having a cowl and a movable windshield including a frame therefor, a substantially T-shaped weather strip supported by and movable with said frame adapted to close the space between said cowl and windshield, the depending leg of said strip having a recess in the side face thereof extending longitudinally of said strip on the side opposite said frame whereby said leg is permitted to have free flexure when the same is moved along the face of said cowl.

4. In combination with a vehicle body having a cowl formed with two faces lying in different planes and a windshield including a frame therefor, a weather strip adapted to close the space between said cowl and windshield, said strip including a body portion secured in a recess in the windshield frame, a member of less cross-sectional area than said body portion extending from said body portion adapted to contact with one face of said cowl, and a second member having its longitudinal axis substantially perpendicular to said body portion adapted to contact with the other face of said cowl remote from said first member, said second member having a recess formed therein to permit flexure relative to said body portion.

5. In combination with a vehicle body having a cowl and a movable windshield including a frame therefor, a weather strip adapted to close the space between said cowl and windshield, said strip including a body portion secured in a recess in the windshield frame, and a member having its longitudinal axis substantially perpendicular to said body portion adapted to contact with said cowl, said member having a recess formed in the side face thereof on the side opposite said body portion and adjacent thereto to permit flexure of said member relative to said body portion whereby said windshield may be moved relative to said cowl without causing binding of said weather strip between said windshield and cowl.

6. A weather strip comprising, a body portion, a curved member extending therefrom, and a member having a relatively heavy free end portion extending longitudinally of said body portion spaced from said curved member and having a recess formed therein to permit flexure of said member in a direction toward said body portion when said end portion is in contact with a stationary member.

7. A weather strip comprising, a body portion, a curved member extending longitudinally of one side of said body portion, and a second member extending longitudinally of said body portion normally substantially perpendicular thereto, said second member having a recess extending longitudinally thereof to permit flexure of said member in a direction toward said body portion.

Signed by me at South Bend, Indiana this 4th day of January, 1929.

DENNIS A. DONAHUE.